UNITED STATES PATENT OFFICE.

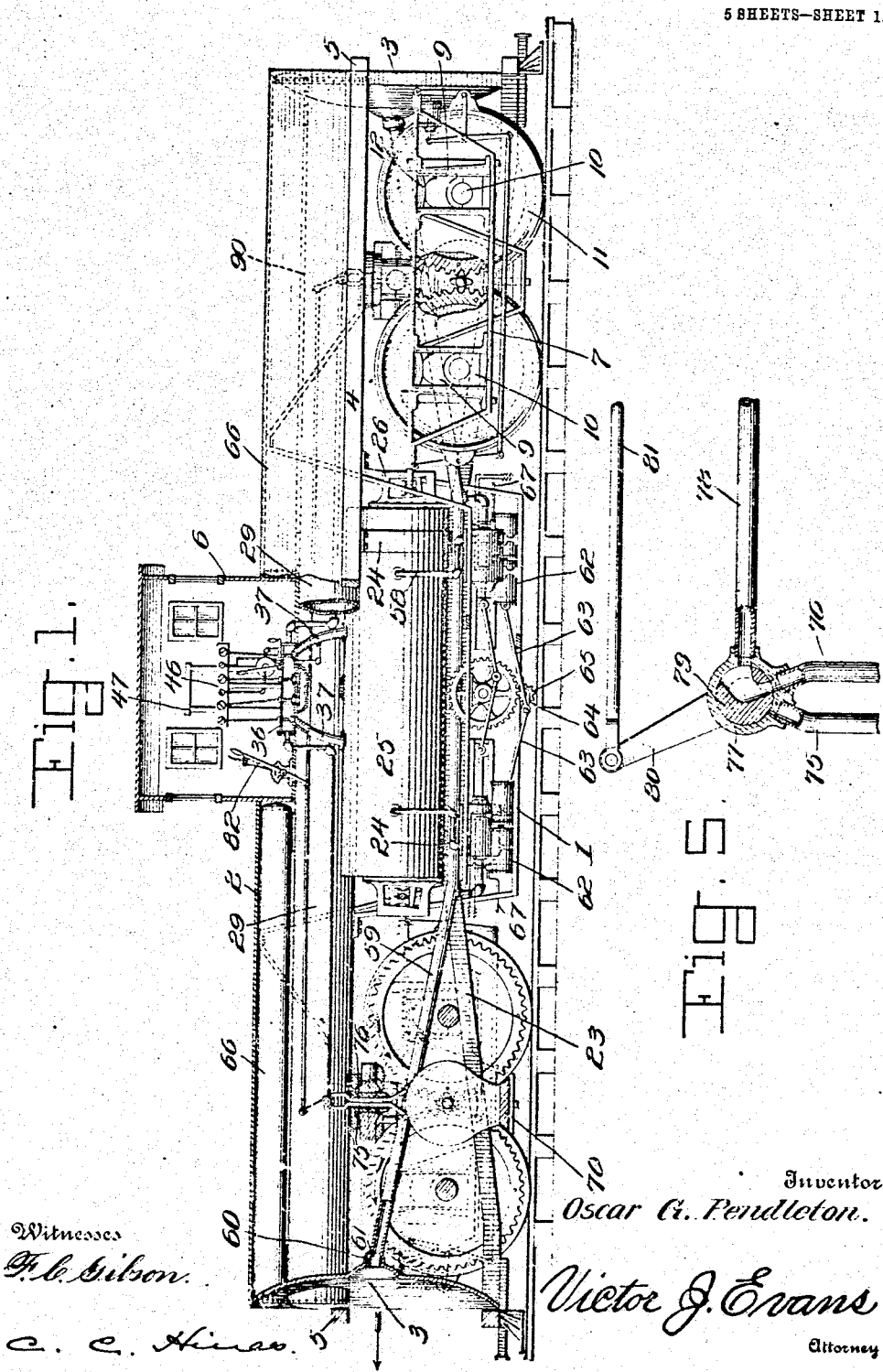

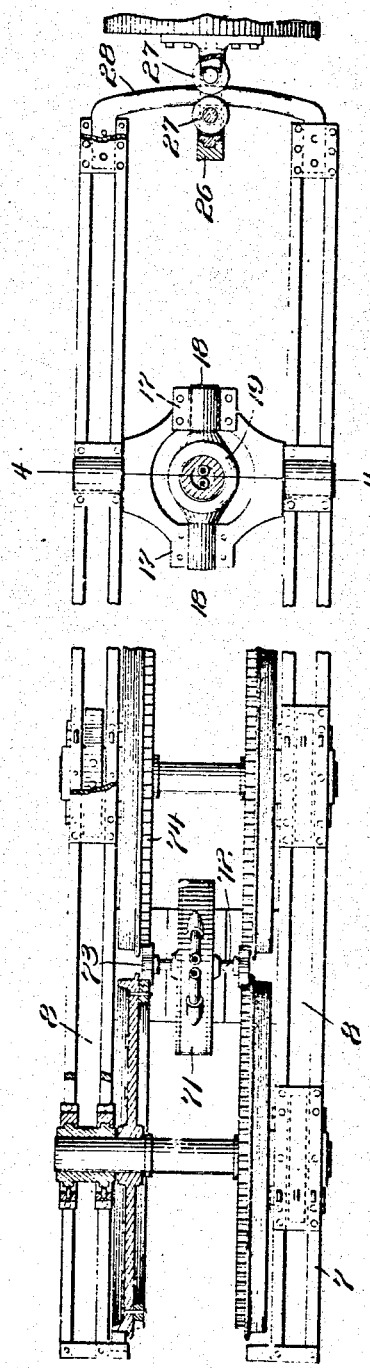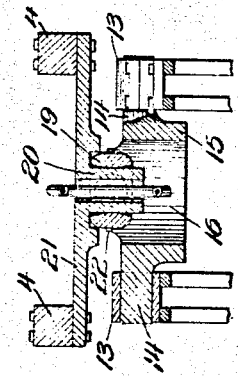

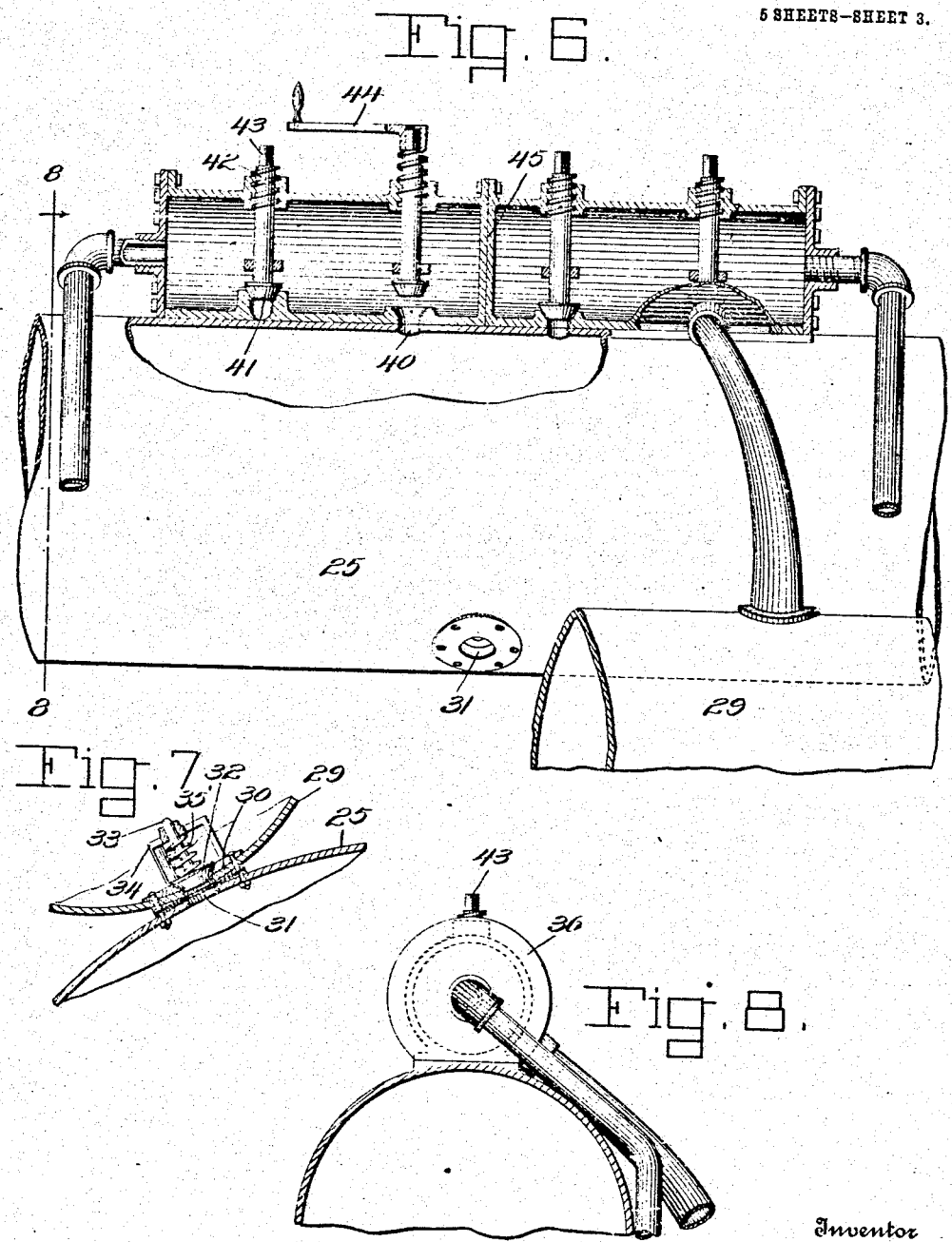

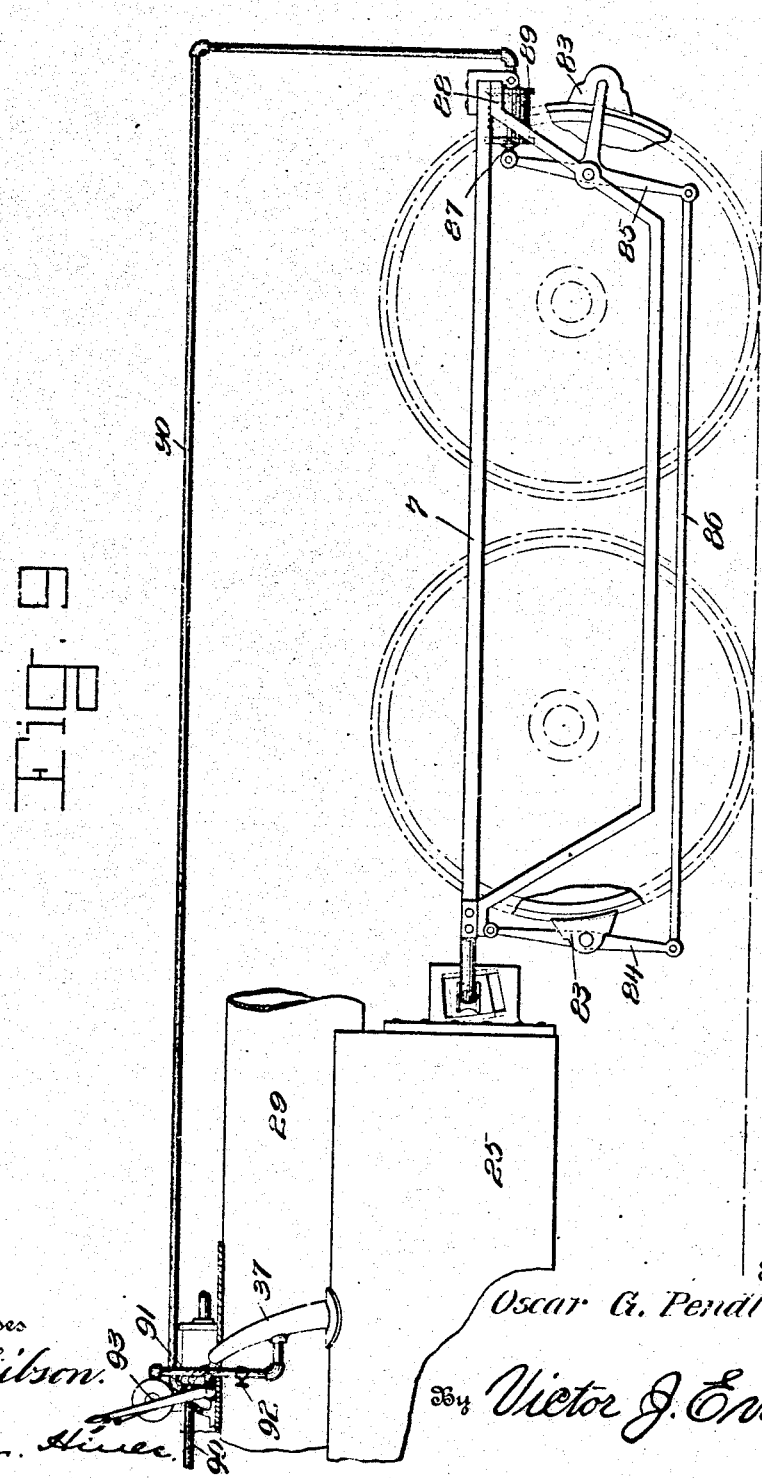

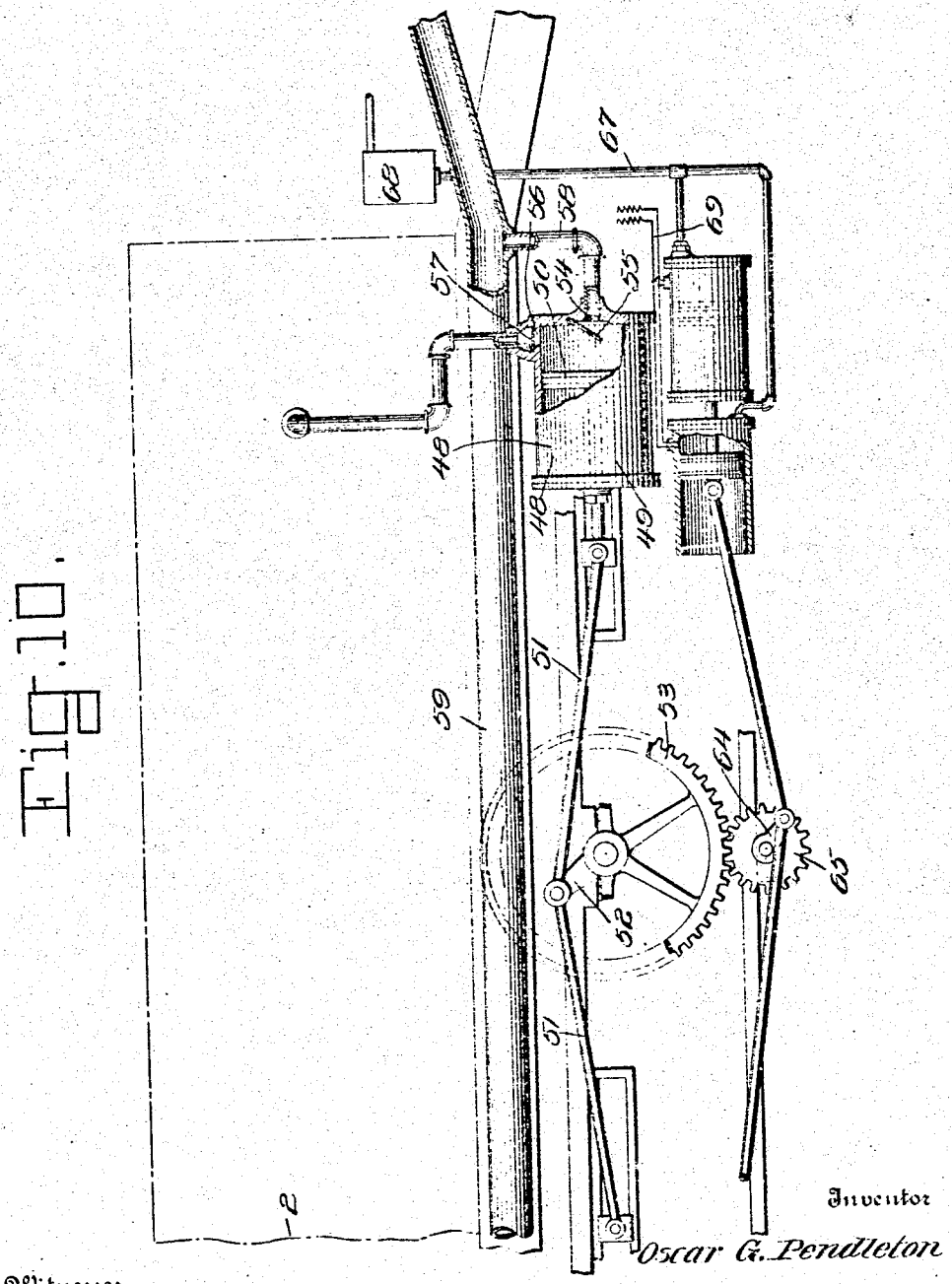

OSCAR G. PENDLETON, OF GIRARD, ILLINOIS.

LOCOMOTIVE.

970,389.
Specification of Letters Patent. Patented Sept. 13, 1910.
Application filed November 6, 1909. Serial No. 526,595.

*To all whom it may concern:*

Be it known that I, OSCAR G. PENDLETON, a citizen of the United States, residing at Girard, in the county of Macoupin and State of Illinois, have invented new and useful Improvements in Locomotives, of which the following is a specification.

This invention relates to locomotives or self-propelled vehicles, the main object of the invention being to provide a locomotive driven by pneumatically operated motors and in which the air or motive fluid is supplied by compressors actuated by internal combustion motors to tanks in which it is stored under pressure and from which it is supplied by means under control of the driver or engineer to the pneumatic motors.

A further object of the invention is to provide simple and effective means for feeding air to the compressors and from the tanks to the motors, for preventing the accumulation of pressure beyond a desired limit, and for controlling the feed to the motors to drive the locomotive in either direction.

A still further object of the invention is to provide an air brake mechanism supplied with air from the storage reservoirs, to provide a strong and durable frame structure, and to provide means for mounting the wheeled trucks of the locomotive to adapt them to accommodate themselves to both vertical and lateral irregularities in the track and relieve the frame and parts of the driving mechanism from the strains to which they are ordinarily subjected.

With these and other objects in view, the invention consists of the features of construction, combination and arrangement of parts hereinafter fully described and claimed, reference being had to the accompanying drawings, in which:

Figure 1 is a side elevation, partly in longitudinal section, of a locomotive embodying my invention. Fig. 2 is a plan view, partly in horizontal section, of one of the trucks. Fig. 3 is a top plan view of the inner end of one of the trucks, showing the connection between the same and the main storage tank. Fig. 4 is a detail transverse section on line 4—4 of Fig. 3. Fig. 5 is a detail view of the air feeding means connected with one of the motors. Fig. 6 is a sectional side elevation showing the valved connections between the chest or distributing box and the air reservoir tanks. Fig. 7 is a detail section showing the valved feed connection between certain storage tanks. Fig. 8 is a transverse section on line 8—8 of Fig. 6. Fig. 9 is a side elevation on an enlarged scale of parts, illustrating particularly the air brake connections associated with each truck. Fig. 10 is a similar view showing, on an enlarged scale, one of the sets of air compressors.

The frame of the engine embodies a suitable central frame structure 1, a partially circular roof or canopy 2, concavo convex end heads 3, and longitudinal side and transverse end bars 4 and 5, respectively, which support the roof or canopy and heads and are suitably connected with and supported from the central frame structure. The canopy overhangs and protects the running gear and working parts of the engine and carries the engine cab 6, which may be arranged at any suitable point along the length thereof.

The frame or body of the locomotive as thus constructed is carried upon any suitable number of wheeled trucks 7, the wheels of which are positively driven from the engine gearing. In the present instance a truck is shown arranged at each end of the frame, each truck comprising a pair of spaced sections 8 formed of angle iron or other suitable material and each provided with bearings 9 for a pair of axles 10 carrying the traction wheels 11. The upper member of each bearing 9 is preferably movably mounted and backed by a spring 12 to permit the axles to have a sufficient amount of yielding vertical play to take up and absorb some of the strains and jars.

Each truck is swiveled upon the frame to have both vertical and lateral motion, being provided with bearings 13 to receive trunnions 14 on a transverse yoke 15 having a vertical passage 16 therein, on which trunnions the truck is adapted to oscillate in a vertical plane to compensate for variations or irregularities in the height of the rails. The yoke is in turn provided with bearings 17 arranged at right angles to the bearings 13 to receive trunnions 18 upon a second yoke 19, which latter is adapted to have lateral oscillatory motion. The yoke 19 receives a hollow stem 20 projecting downward from a cross bar 21 fixed to the longitudinal frame bars 4, said stem being secured to the yoke by one or more bolts or other suitable fastenings 22, whereby the truck is detachably secured to the frame and a relative lateral motion between the truck and locomotive body permitted to adapt the wheels to easily follow curvatures and lateral irregularities in the track. It will thus be seen that a novel and peculiar construction of swivel or universal joint connection between each truck and the body or frame is provided to permit the truck to adapt itself freely to both vertical and lateral irregularities in the track without throwing strain upon the frame structure.

The frame structure is reinforced by one or more longitudinal tie bars 23, each having a horizontal portion fixed to the central frame member 1 and outwardly and downwardly inclined end portions fixed to the heads 3, whereby the latter are strengthened and braced and rigidly coupled to the said central frame member. Supported by the central frame member and hung by bands or straps 24 from the frame bars 4 is a main or primary air storage tank 25, which tank is provided at its ends with open guide brackets 26, each having a pair of spaced grooved guide pulleys 27 mounted therein on vertical axes. The sections of each truck 7 are connected at their rear ends by arcuate guide rods 28 which extend through the brackets and run in contact with the pulleys, which brackets and rods form connections to limit the lateral movements of the truck and prevent strain from coming upon the yokes from the jars and concussions received in coupling the locomotive to cars.

Arranged above and on each side of the main storage tank 25 are supplemental or auxiliary storage tanks 29, one of which is herein shown, each of which tanks 29 is coupled to the tank 25 by a gasket or air tight coupling connection 30, in which is formed a port or passage 31 for the flow of air between said reservoir. This port is controlled by a check valve 32 having a stem 33 movable in a guide bracket 34 and normally held closed by a spring 35. Compressed air is supplied to and stored in the tank 25 in the manner hereinafter described and flows therefrom through the ports 31 into the tanks 29. The tank 25 is in communication with an air chest or storage box 36 arranged in the engineer's cab 6 through feed pipes 37. This chest extends over the tanks 29 and is in direct communication therewith through ports 40, whereby the air contained in the tanks is supplied to the chest for service in driving motors hereinafter described. The pipes 37 and ports 40 are provided with valve seats adapted to be engaged by valves 41 each mounted upon a stem having a screw threaded engagement with the chest, as at 42, and provided with an angular upper end 43 for the application of a crank or handle 44, by which communication between the tanks and the chest may be cut off or controlled as desired. Preferably, a driving motor is mounted upon each individual truck and the chest is made in two sections or divided by a partition 45 into separate supply chambers for each motor, the tanks communicating through the feed pipes and ports described with said chambers. By this means the supply of compressed air to the motors may be independently controlled. Arranged within the cab is a rack 46 supporting a series of gages 47 communicating with the parts of the chest and feed pipes of the apparatus by which the pressure in the tanks and different feed connections may be readily determined at any time.

Compressed air is supplied to the tank 25 by a pair of air compressors 48 supported in longitudinal alinement below said tank upon the frame portion 1. Each of said compressors comprises a cylinder 49 having a piston 50 operating therein, said pistons being coupled by connecting rods 51 to a crank 52 on the shaft of a gear wheel 53 mounted between the compressors. Each cylinder 49 is provided with an inlet port 54 controlled by a check valve 55 and with a discharge port 56 controlled by a check valve 57. The inlet ports 54 of the compressors are connected by pipes 58 with a main air supply pipe 59 extending longitudinally of the engine, and the ends of which communicate with air feed ports 60 in the concavo convex or conical heads 3, which ports are respectively controlled by inwardly movable check valves 61. When the locomotive is in motion, air will be gathered by the forward conical head and flow back through the pipe 59 to the compressors, the forward valve 61 opening for the admission of the air, while the rear valve 61 closes under the resultant pressure to retain the collected air within the pipe.

The air compressors are driven by internal combustion or gasolene engines 62 of the duplex cylinder type, each having its cylinders arranged in tandem and its pistons coupled for movement in unison. The pistons of the two internal combustion engines are connected by rods 63 with a crank 64 on the shaft of a drive gear or pinion 65 which meshes with and imparts motion to the gear 53, whereby the compressors are driven. Gasolene storage tanks 66 are suitably mounted beneath the canopy 2 and are connected with the engines by feed pipes 67, in each of which any suitable type of carbureter may be arranged, as shown in Fig. 10.

69 denotes the circuit wires of the sparking mechanisms of the engines, which may be of any preferred type.

In practice, any preferred type of means or governor mechanism controlled by the pressure of the air in the storage reservoirs, may be employed to automatically throw the engines and compressors out of operation when the pressure reaches a predetermined degree.

Mounted upon each truck is a bed 70 supporting a turbine motor 71, the shaft 72 of which is provided with driving pinions 73 meshing with gear rims 74 on the associated wheels 11, by which said wheels are driven. Each motor casing is provided with feed ports for the supply of fluid pressure to drive the turbine wheel thereof in opposite directions. With these ports respectively communicate feed pipes 75 and 76 connected by a valve casing 77 with a supply pipe 8 leading from the chest 36. In said casing is a rotary two way valve 79 having a blank position for cutting off the supply of air to the pipes 75 and 76 and reverse feeding positions in which it connects one or the other of said pipes with the pipe 78. Connected with the stem of the valve is an arm 80 to which is pivoted a rod 81 coupled to a controlled lever 82 in the engineer's cab whereby said valve may be operated. The rod 81 is connected with the arms 80 of the feed valves associated with the turbine motors of both trucks, so that the supply of air to both motors may be alike controlled. Suitable locking mechanism, as an ordinary pawl and rack, is provided to secure the lever 82 in adjusted position.

From the foregoing description, it will be seen that the invention provides a simple type of engine in which provision is made for securing an easy running motion and in which the traction wheels are directly propelled by pneumatically driven motors under the complete control of the engineer, which motors are driven by compressed air from storage tanks to which the air is supplied by compressors actuated by internal combustion motors. It will also be seen that by means of the controlling valve associated with the air chest, the air may be fed from either storage tank at will or from all of the tanks simultaneously as the weight of the load may demand, and that in hauling light loads the air from the main compressor or reservoir may be used so that that contained in the auxiliary reservoirs may be kept in reserve for future use. A powerful, and yet light weight, locomotive is thus produced which is economical in operation and comparatively inexpensive of production.

Each truck is provided with its own air brake mechanism in order that the engine may be completely and efficiently controlled. As shown, the brake shoes 83 are carried by levers 84 and 85, coupled by a connecting rod 86, one of which levers is pivotally connected with the truck frame and the other pivotally connected with the rod 87 of the air brake piston 88 mounted in a brake cylinder 89 supported on the truck frame. Communicating with the cylinder is an air feed pipe 90 having a connection 91 with one of the pipes 37, in which connection is an ordinary reducing valve 92. An engineer's brake valve 93, of any ordinary or suitable type, is provided in the connection 91 for controlling the supply of air to the brake cylinders.

Having thus fully described the invention what is claimed as new is:

1. A locomotive comprising a frame, a truck swiveled to the frame, the swivel connection having a passage, a fluid pressure turbine on the truck in gear with the wheels thereof, pressure supplying means, and a feed connection between said supplying means and the motor extending through said passage.

2. A locomotive comprising a frame, trucks swiveled to and supporting the frame, driving wheels upon each truck, said wheels being provided with gear teeth, a turbine supported upon the truck having its shaft provided with pinions meshing with the teeth of the driving wheels, and a feed connection extending downwardly through the pivotal connection of the truck for supplying a fluid pressure to said turbine.

3. A locomotive comprising a frame, a truck swiveled to the frame, the swiveled connection having a passage, driving wheels upon the truck provided with gear teeth, a fluid pressure turbine on the truck having its shaft provided with pinions meshing with said teeth, conductors extending downward through said passage in the swiveled connection and connected with the turbine for supplying the fluid pressure to drive the same in reverse direction, a supply pipe, a valve for connecting the supply pipe with either of said conductors, and means for controlling said valves.

4. A locomotive comprising a frame, fluid pressure generating and storing means upon the frame, trucks supporting the frame, driving wheels upon the trucks provided with gear teeth, fluid pressure turbines upon the trucks having their shafts provided with pinions meshing with the gear teeth of the driving wheels, conductors leading downward through the pivotal connections of the trucks for supplying fluid pressure to the turbines, valves for said conductors, and means for controlling said valves.

5. A locomotive comprising a frame, fluid pressure driven running gearing supporting the frame, said gearing including a reservoir, an air supply pipe, a pair of spaced pumps each consisting of a cylinder and a piston, the cylinder having a valved inlet communicating with the air supply pipe, and a valve outlet communicating with the reservoir, a crank gear arranged between and connected with the pistons of the pumps, hydrocarbon motors arranged alongside the pumps, and a crank driven gear actuated by said motors and meshing with the first named gear.

In testimony whereof I affix my signature in presence of two witnesses.

OSCAR G. PENDLETON.

Witnesses:
G. G. GARRETSON,
ALVIN FITE.